(12) United States Patent
Schaedler et al.

(10) Patent No.: US 9,719,176 B2
(45) Date of Patent: Aug. 1, 2017

(54) THERMAL BARRIER MATERIALS AND COATINGS WITH LOW HEAT CAPACITY AND LOW THERMAL CONDUCTIVITY

(71) Applicant: HRL Laboratories, LLC, Malibu, CA (US)

(72) Inventors: Tobias A. Schaedler, Oak Park, CA (US); Adam F. Gross, Santa Monica, CA (US); Andrew P. Nowak, Los Angeles, CA (US); John A. Martin, Los Angeles, CA (US); Joanna A. Kolodziejska, Arcadia, CA (US)

(73) Assignee: HRL Laboratories, LLC, Malibu, CA (US)

( * ) Notice: Subject to any disclaimer, the term of this patent is extended or adjusted under 35 U.S.C. 154(b) by 441 days.

(21) Appl. No.: 14/491,974

(22) Filed: Sep. 19, 2014

(65) Prior Publication Data
US 2016/0194762 A1 Jul. 7, 2016

Related U.S. Application Data

(60) Provisional application No. 61/880,247, filed on Sep. 20, 2013.

(51) Int. Cl.
*B22F 1/00* (2006.01)
*C22C 1/04* (2006.01)
(Continued)

(52) U.S. Cl.
CPC ............ *C23C 30/00* (2013.01); *B22F 1/0051* (2013.01); *C04B 35/62222* (2013.01);
(Continued)

(58) Field of Classification Search
None
See application file for complete search history.

(56) References Cited

U.S. PATENT DOCUMENTS 3,674,461 A * 7/1972 Fernand et al. ............ B01J 2/00
    419/6
5,305,726 A * 4/1994 Scharman ................ C23C 4/02
    428/432
(Continued)

FOREIGN PATENT DOCUMENTS

WO  2009020206 A1  2/2009
WO  2013038249 A2  3/2013

OTHER PUBLICATIONS

Ashby, "The properties of foams and lattices," Phil. Trans. R. Soc. A 2006 364.
(Continued)

*Primary Examiner* — David Sample
*Assistant Examiner* — Donald M Flores, Jr.
(74) *Attorney, Agent, or Firm* — George R. Rapacki; Albert T. Wu

(57) ABSTRACT

Thermal barrier materials are provided that possess low heat capacity and low thermal conductivity, while at the same time, high structural integrity and robustness. In some embodiments, the disclosed coating comprises metal-containing spheres that are sintered or glued together and/or embedded in a matrix. The coating has at least 60% void volume fraction and closed porosity. The coating thickness is from 50 microns to 500 microns, and the metal spheres have an average diameter that is from about 5% to about 30% of the coating thickness. In some embodiments, the metal spheres have an average diameter that is 4-10 times smaller than the coating thickness. Thermal barrier materials with these coatings can be beneficial in engine applications, for example.

19 Claims, 12 Drawing Sheets

(51) Int. Cl.
| | |
|---|---|
| C22C 19/05 | (2006.01) |
| C04B 35/64 | (2006.01) |
| C04B 35/622 | (2006.01) |
| C23C 30/00 | (2006.01) |
| C23C 26/00 | (2006.01) |
| C23C 24/08 | (2006.01) |
| C23C 24/10 | (2006.01) |
| C25D 15/00 | (2006.01) |
| C25D 1/08 | (2006.01) |
| C25D 1/12 | (2006.01) |
| C25D 3/12 | (2006.01) |
| C23C 18/16 | (2006.01) |

(52) U.S. Cl.
CPC ............ C04B 35/64 (2013.01); C22C 1/0433 (2013.01); C22C 19/055 (2013.01); C22C 19/056 (2013.01); C23C 18/1662 (2013.01); C23C 24/085 (2013.01); C23C 24/103 (2013.01); C23C 26/00 (2013.01); C25D 15/00 (2013.01); C23C 18/1648 (2013.01); C23C 18/1657 (2013.01); C25D 1/08 (2013.01); C25D 1/12 (2013.01); C25D 3/12 (2013.01)

(56) References Cited

U.S. PATENT DOCUMENTS

| | | | | |
|---|---|---|---|---|
| 5,492,870 | A * | 2/1996 | Wilcox | C01B 13/328 106/409 |
| 6,071,628 | A * | 6/2000 | Seals | C23C 28/00 428/610 |
| 6,162,310 | A * | 12/2000 | Tseng | B22F 3/1112 156/155 |
| 6,210,791 | B1 * | 4/2001 | Skoog | C04B 41/009 106/286.5 |
| 7,666,807 | B2 * | 2/2010 | Heung | B01D 67/0058 502/262 |
| 2002/0136884 | A1 | 9/2002 | Oechsner | |
| 2003/0077473 | A1 | 4/2003 | Bretschneider et al. | |
| 2003/0104147 | A1 | 6/2003 | Bretschneider et al. | |
| 2006/0065330 | A1 * | 3/2006 | Cooper | C22C 1/08 148/538 |
| 2013/0146041 | A1 | 6/2013 | Hijii et al. | |

OTHER PUBLICATIONS

Clarke et al., "Materials Design for the next Generation Thermal Barrier Coatings" Annu. Rev. Mater. Res. 33 p. 383-417 (2003).
Erlebacher et al., "Evolution of nanoporosity in dealloying" Nature vol. 410 p. 450 (2001).
Göhler et al., "Metallic hollow sphere structures—status and outlook" CellMat 2010 Conference Proceedings.
Banhart, "Light-Metal Foams—History of Innovation and Technological Challenges" Advanced Engineering Materials 15, No. 3 p. 82. (2013).
Kosaka et al., "Concept of Temperature Swing Heat Insulation" in Combustion Chamber Walls and Appropriate Thermophysical Properties for Heat Insulation Coat SAE Int. J. Engines vol. 6, Issue 1 p. 142 (2013).
Solórzano et al., "Thermal Properties of Hollow Spheres," Multifunctional Metallic Hollow Sphere Struct., pp. 89-107 (2009).
Gross et al.,, "Hierarchical Carbon Foams with Independently Tunable Mesopore and Macropore Size Distributions," Langmuir 26(13), 11378-11383 (2010).
International Search Report in corresponding PCT application, PCT/US2014/056694, dated Jan. 20, 2015.

* cited by examiner

A METAL FACESHEET IS PLACED ON TOP AND HEATED BY TRANSVERSE (SHOWN ABOVE) OR LONGITUDINAL FIELD INDUCTION

THERMAL BARRIER MATERIALS AND COATINGS WITH LOW HEAT CAPACITY AND LOW THERMAL CONDUCTIVITY

PRIORITY DATA

This patent application is a non-provisional application with priority to U.S. Provisional Patent App. No. 61/880,247 filed Sep. 20, 2013, which is hereby incorporated by reference herein.

FIELD OF THE INVENTION

The present invention generally relates to thermal barrier materials and coatings.

BACKGROUND OF THE INVENTION

Thermal barrier coatings are highly advanced material systems usually applied to metallic surfaces, such as gas turbines or aero-engine parts, operating at elevated temperatures, as a form of exhaust heat management. These coatings serve to insulate components from large and prolonged heat loads by utilizing thermally insulating materials which can sustain an appreciable temperature difference between the load-bearing alloys and the coating surface. In doing so, these coatings can allow for higher operating temperatures while limiting the thermal exposure of structural components, extending part life by reducing oxidation and thermal fatigue.

In certain commercial applications, materials are desired that possess low thermal conductivity and low heat capacity, while fulfilling requirements of high-temperature capability and structural integrity during repeated temperature cycling and operational stresses and mechanical loads. Materials with low thermal conductivity are of interest when thermal protection is necessary or when heat loss is undesired. Materials with low heat capacity are of interest for applications in which temperature swings are encountered and when the insulation material should not significantly affect the temperature swing.

In the internal combustion engine, materials that insulate the hot combustion gas from the cold, water-cooled engine block are desired to avoid energy loss by transferring heat from the combustion gas to the cooling water. At the same time, during the intake cycle, the insulation material should cool down rapidly in order to not heat up the fuel-air mixture before ignition to avoid knocking. See Kosaka et al., "Concept of Temperature Swing Heat Insulation in Combustion Chamber Walls and Appropriate Thermophysical Properties for Heat Insulation Coat," *SAE Int. J. Engines* Vol. 6, Issue 1 p. 142 (2013). For such an application, low thermal conductivity and low heat capacity is required. Furthermore, low thermal conductivity is only required at high temperatures; at low temperatures, a higher thermal conductivity is beneficial.

The existing practice utilizes ceramic thermal barrier coatings (TBCs), typically 7 wt % yttria-stabilized zirconia. TBCs have very low thermal conductivity (0.8-1.6 W/m·K at room temperature), but relatively high heat capacity (2000-2300 kJ/m$^3$·K at room temperature). The 10-20% porosity created by the deposition method is either random between different "splats" for plasma-sprayed coatings or "feather-like" for electron beam vapor-deposited coating, as explained in Clarke and Levi, "Materials Design for the next Generation Thermal Barrier Coatings" *Annu. Rev. Mater. Res.* 33 pp. 383-417 (2003). Both types of cellular architecture are detrimental to structural integrity, and the brittle ceramic material causes low damage tolerance. Another disadvantage is that both cellular architectures are fairly open and gases from the outside can access many of the pores and even the underlying substrate.

Other prior art for thermal barrier materials includes thermal protection systems for space applications, such as tile for the Space Shuttle. Shuttle tiles exhibit low thermal conductivity and low heat capacity, but these materials are designed for extreme temperatures (greater than 1300° C.) and have poor mechanical properties (crush strength less than 0.5 MPa). They often cannot be reused after one flight due to changes in shape. These tiles are open cellular structures and absorb significant amount of water, which increases mass and results in damage when the water is vaporized during exposure to high temperatures.

In view of the prior art, what is needed is a thermal barrier material that possesses low heat capacity and low thermal conductivity, while at the same time, high structural integrity and robustness. Such thermal barrier materials preferably are suitable for both coatings and for bulk (freestanding) materials and parts. Good performance is desired even in thin coatings.

SUMMARY OF THE INVENTION

The present invention addresses the aforementioned needs in the art, as will now be summarized and then further described in detail below.

In some variations, the invention provides a coating comprising metal-containing spheres that are sintered or glued together and/or embedded in a matrix, wherein the coating has at least 60% void volume fraction and closed porosity, wherein the coating has a coating thickness from about 50 microns to about 500 microns, and wherein the metal spheres have an average diameter that is from about 5% to about 30% of the coating thickness.

In some embodiments, the average diameter is from about 10% to about 25% of the coating thickness. This translates to the metal spheres having an average diameter that is 4-10 times smaller than the coating thickness.

In some embodiments, the void volume fraction of the coating is at least 75%, 80%, or 85%. The coating thickness is less than 200 microns, in some embodiments.

In some embodiments, the metal-containing spheres have an average diameter to sphere-wall thickness ratio greater than 10. The metal-containing spheres may contain micropores having an average micropore diameter of less than 10 microns, such as 1 micron or less.

In some embodiments, the metal-containing spheres contain one or more metals selected from the group consisting of nickel, cobalt, cobalt alloys, iron, chromium, tungsten, molybdenum, phosphorus, copper, zirconium, hafnium, titanium, niobium, tantalum, rhenium, alloys thereof, and combinations thereof. In these or other embodiments, the metal-containing spheres contain one or more ceramics selected from the group consisting of zirconium oxide-based ceramics, aluminum oxide-based ceramics, silicon oxide-based ceramics, mullite, silicon nitride-based ceramics, silicon carbide-based ceramics, boron nitride-based ceramics, aluminum nitride-based ceramics, and combinations thereof.

The coating may further comprise, or be adjacent to, at least one face-sheet disposed on a surface of the coating.

In some embodiments, the coating further comprises one or more spaceholder materials, such as materials selected from the group consisting of $ZnBr_2$, $MgBr_2$, $CaCO_3$, $MgCO_3$, $ZnCO_3$, polymers, organic waxes, glass colloids, and combinations thereof.

In some embodiments, the coating has a thermal conductivity of less than 10 W/m·K at 25° C., and a volumetric heat capacity of less than 1000 $kJ/m^3$·K at 25° C. In certain embodiments, the thermal conductivity is less than 2 W/m·K at 25° C. and/or the volumetric heat capacity is less than 300 $kJ/m^3$·K at 25° C. The coating has a crush strength of about 1 MPa or higher, in various embodiments of the invention.

Some variations provide a thermal barrier material comprising a coating that includes metal-containing spheres sintered or glued together and/or embedded in a matrix, wherein the coating has at least 60% void volume fraction and closed porosity, wherein the coating has a coating thickness from about 50 microns to about 500 microns, and wherein the metal spheres have an average diameter that is from about 5% to about 30% of the coating thickness. In some embodiments, the thermal barrier material coating thickness is less than 200 microns, and the average diameter is from about 10% to about 25% of the coating thickness.

Certain variations provide a coating comprising sintered metal spheres, wherein the coating has at least 85% void volume fraction and closed porosity, wherein the coating has a coating thickness from about 50 microns to about 200 microns, and wherein the metal spheres have an average diameter that is from about 10% to about 25% of the coating thickness.

In some variations, the invention provides a three-dimensional microstructure comprising one or more metals and/or one or more ceramics, wherein the microstructure is porous with at least 60% void volume fraction and with closed porosity, and wherein the microstructure has a thermal conductivity of less than 10 W/m·K at 25° C., a volumetric heat capacity of less than 1000 $kJ/m^3$·K at 25° C., and a crush strength of about 1 MPa or higher.

In some embodiments, the closed porosity is attained with closed cells within the microstructure. For example, the microstructure may include closed-cell foam with an average pore size of less than 0.2 mm.

In some embodiments, the closed porosity is attained with face-sheets disposed on the microstructure. The microstructure may include an open-celled micro-foam or micro-truss structure with an average cell size less than 0.2 mm. The microstructure may alternatively or additionally include a honeycomb configuration with a cell size less than 0.2 mm. The face-sheets may be disposed on the top or bottom of the microstructure to attain the closed porosity.

In some embodiments, the microstructure comprises a plurality of hollow spheres having an average sphere diameter of less than 0.2 mm and an average sphere diameter to wall thickness ratio greater than 10. In certain embodiments, the hollow spheres are bonded together with an adhesive and/or embedded in a matrix material. In other embodiments, the hollow spheres are sintered together without an adhesive or matrix material.

In some embodiments, the microstructure includes hierarchical porosity comprising macropores having an average macropore diameter of 10 microns or greater and micropores having an average micropore diameter of less than 10 microns. In certain embodiments, the average macropore diameter is 100 microns or greater and the average micropore diameter is 1 micron or less.

The microstructure may generally include a plurality of hollow shapes selected from the group consisting of spheres, cubes, rods, octets, irregular shapes, random shapes, and combinations thereof, wherein the hollow shapes have an average maximum dimension of less than 0.2 mm and an average ratio of maximum dimension to wall thickness greater than 10.

The void volume fraction of the microstructure is at least 65%, 70%, 75%, 80%, 85%, or 90%, in various embodiments.

In preferred embodiments, the thermal conductivity is less than 2 W/m·K measured at 25° C., such as less than 1 W/m·K or less than 0.1 W/m·K at 25° C. In preferred embodiments, the volumetric heat capacity is less than 500 $kJ/m^3$·K measured at 25° C., such as less than 200 $kJ/m^3$·K at 25° C.

In some embodiments, the microstructure has a crush strength of at least about 1.5, 2, 3, 4, 5, 6, 7, 8, 9, 10 MPa or higher.

The microstructure may include one or more metals selected from the group consisting of nickel, cobalt, cobalt alloys, iron, chromium, tungsten, molybdenum, phosphorus, copper, zirconium, hafnium, titanium, niobium, tantalum, rhenium, alloys thereof, and combinations thereof. Alternatively, or additionally, the microstructure may include one or more ceramics selected from the group consisting of zirconium oxide-based ceramics, aluminum oxide-based ceramics, silicon oxide-based ceramics, mullite, silicon nitride-based ceramics, silicon carbide-based ceramics, boron nitride-based ceramics, aluminum nitride-based ceramics, and combinations thereof.

In certain embodiments, the microstructure further comprises one or more spaceholder materials, such as spaceholder materials selected from the group consisting of $ZnBr_2$, $MgBr_2$, $CaCO_3$, $MgCO_3$, $ZnCO_3$, polymers, organic waxes, glass colloids, and combinations thereof.

Some variations of the present invention provide a three-dimensional microstructure comprising one or more metals and/or one or more ceramics, wherein the microstructure is porous with at least 85% void volume fraction and with closed porosity, and wherein the microstructure has a thermal conductivity of less than 2 W/m·K at 25° C., and a volumetric heat capacity of less than 300 $kJ/m^3$·K at 25° C. In some embodiments, the void volume fraction of the microstructure is at least 86%, 87%, 88%, 89%, 90%, or higher.

The microstructure may include one or more metals selected from the group consisting of nickel, cobalt, cobalt alloys, iron, chromium, tungsten, molybdenum, phosphorus, copper, zirconium, hafnium, titanium, niobium, tantalum, rhenium, alloys thereof, and combinations thereof. Alternatively, or additionally, the microstructure may include one or more ceramics selected from the group consisting of zirconium oxide-based ceramics, aluminum oxide-based ceramics, silicon oxide-based ceramics, mullite, silicon nitride-based ceramics, silicon carbide-based ceramics, boron nitride-based ceramics, aluminum nitride-based ceramics, and combinations thereof.

In some embodiments, the microstructure includes a plurality of hollow shapes selected from the group consisting of spheres, cubes, rods, octets, irregular shapes, random shapes, and combinations thereof, wherein the hollow shapes have an average maximum dimension of less than 0.2 mm and an average ratio of maximum dimension to wall thickness greater than 10. In certain embodiments, the hollow shapes comprise, or consist essentially of, hollow spheres. The hollow shapes may be sintered together without an adhesive or matrix material. Alternatively, or additionally, the hollow shapes may be bonded together with an adhesive and/or the hollow shapes may be embedded in a matrix material.

In some embodiments, the three-dimensional microstructure has a thermal conductivity less than 0.5 W/m·K at 25° C. In these or other embodiments, the three-dimensional microstructure has a volumetric heat capacity less than 200 kJ/m$^3$·K at 25° C.

The present invention, in some variations, also provides a method of coating a substrate with a thermal barrier material, the method comprising coating the substrate with a three-dimensional microstructure comprising one or more metals and/or one or more ceramics, wherein the microstructure is porous with at least 60% void volume fraction and with closed porosity, and wherein the microstructure has a thermal conductivity of less than 10 W/m·K at 25° C. and a volumetric heat capacity of less than 1000 kJ/m$^3$·K at 25° C.

In some embodiments, the method comprises depositing a coating precursor together with a spaceholder material, and then removing at least a portion of the spaceholder material to generate the three-dimensional microstructure. The method may include a coating technique selected from the group consisting of electrolytic deposition, electroless deposition, sedimentation co-deposition, electrophoresis, slurry coating, dip coating, spray coating, painting, and combinations thereof.

In some embodiments, the method comprises depositing a coating precursor through a spaceholder material, and then removing at least a portion of the spaceholder material (such as by heating) to generate the three-dimensional microstructure. In some of these embodiments, the method includes a coating technique selected from the group consisting of template plating, electrolytic alloy plating, electroless alloy plating, and combinations thereof.

In these methods, the spaceholder material may be selected from, but is not limited to, $ZnBr_2$, $MgBr_2$, $CaCO_3$, $MgCO_3$, $ZnCO_3$, a polymer, an organic wax, a glass colloid, or a combination thereof.

In some embodiments, the method comprises depositing a porous closed-cell or open-cell coating, and then capping the coating with an additional solid layer. Coating particles may be applied to the substrate by thermal or plasma spraying, for example.

In some embodiments, the method comprises pressing or fitting coating particles onto the substrate, and then sintering the coating particles for fusing or casting to the substrate. A sintering technique may be selected from the group consisting of radiant heating, induction, spark plasma sintering, microwave heating, capacitor discharge sintering, and combinations thereof.

Other variations provide a method of forming a freestanding thermal barrier material, the method comprising combining a coating precursor with a spaceholder, and then removing at least a portion of the spaceholder to generate a three-dimensional microstructure comprising one or more metals and/or one or more ceramics, wherein the microstructure is porous with at least 60% void volume fraction and with closed porosity, and wherein the microstructure has a thermal conductivity of less than 10 W/m·K at 25° C. and a volumetric heat capacity of less than 1000 kJ/m$^3$·K at 25° C.

In some embodiments, the method comprises coating the spaceholder, in granular form, with the one or more metals and/or one or more ceramics; and then, following the removing at least a portion of the spaceholder, arranging resulting granular hollow material in a desired shape and sintering or bonding it together.

In some embodiments, the method comprises coating the spaceholder, in granular form, with the one or more metals and/or one or more ceramics; arranging resulting granular material in a desired shape and sintering or bonding it together; and removing at least a portion of the spaceholder during or after the sintering or bonding.

In some embodiments, the method comprises slip-casting a slurry comprising the spaceholder into a mold, and then sintering the slurry. Alternatively, or additionally, the method may comprise slip-casting a slurry into a mold comprising the spaceholder (i.e. the mold, not the slurry, contains the spaceholder), and then sintering the slurry.

In certain embodiments, the method includes mixing the spaceholder with a matrix material, and then removing at least a portion of the spaceholder prior to or during sintering to form the freestanding thermal barrier material.

DETAILED DESCRIPTION OF EMBODIMENTS OF THE INVENTION

Figure 1:
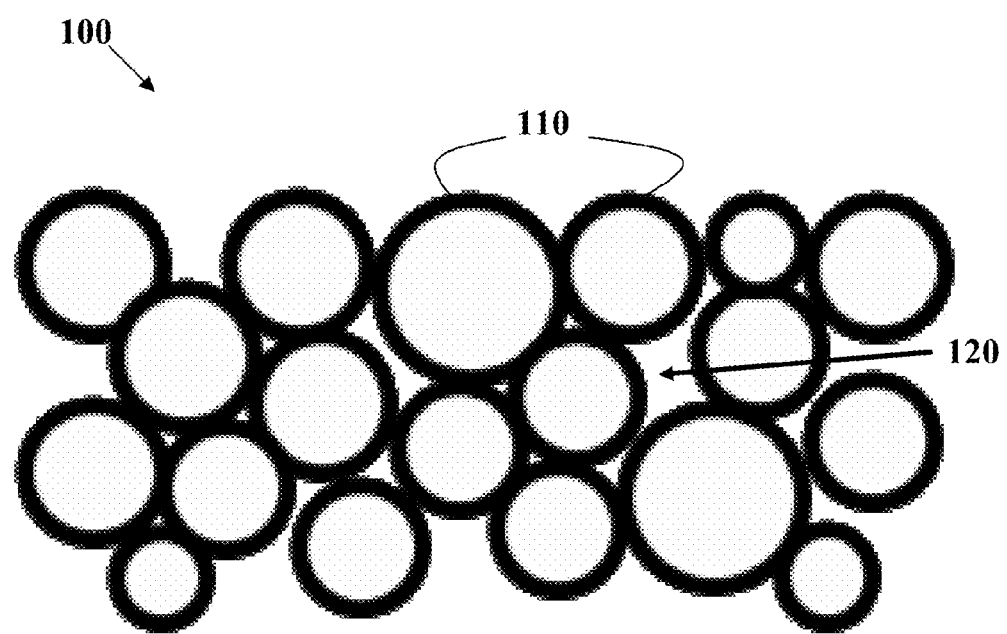
FIG. 1 is a schematic of a cellular architecture (thermal barrier material microstructure) with sintered hollow spheres, in some embodiments.

The structures, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Variations of the present invention provide structures and compositions of cellular materials that exhibit low thermal conductivity and low volumetric heat capacity, and methods to fabricate these materials. In some embodiments, the invention entails a cellular material that is characterized by a low heat capacity and low thermal conductivity, achieved by (i) structurally possessing high porosity in a closed-celled structure and (ii) containing compositions with low intrinsic thermal conductivity.

In preferred embodiments, both thermal conductivity and volumetric heat capacity are minimized by adjusting or controlling the cellular architecture on the micron scale. In addition, the cellular architecture and constituent materials are preferably designed or optimized to enhance structural integrity and withstand repetitive stresses from thermal expansion and shrinkage. Structural integrity and robustness may be achieved by a combination of resilient cellular architecture and strong base materials, e.g. nickel alloys.

The invention provides, among other things, cellular materials that exhibit low thermal conductivity and low volumetric heat capacity, and methods to fabricate these materials. It has been discovered that surprisingly low heat capacity and low thermal conductivity, simultaneously with good mechanical and thermal cycling properties, can be achieved by optimizing the interplay of cellular architecture, spatial configuration of voids and solid, and the solid constituent material.

In some variations, the invention provides a coating comprising metal-containing spheres that are sintered or glued together and/or embedded in a matrix, wherein the coating has at least 60% void volume fraction and closed porosity, wherein the coating has a coating thickness from about 50 microns to about 500 microns, and wherein the metal spheres have an average diameter that is from about 5% to about 30% of the coating thickness.

In some embodiments, the average diameter is from about 10% to about 25% of the coating thickness. This translates to the metal spheres having an average diameter that is 4-10 times smaller than the coating thickness.

In some embodiments, the void volume fraction of the coating is at least 75%, 80%, or 85%. The coating thickness is less than 200 microns, in some embodiments.

In some embodiments, the metal-containing spheres have an average diameter to sphere-wall thickness ratio greater than 10. The metal-containing spheres may contain micropores having an average micropore diameter of less than 10 microns, such as 1 micron or less.

In some embodiments, the metal-containing spheres contain one or more metals selected from the group consisting of nickel, cobalt, cobalt alloys, iron, chromium, tungsten, molybdenum, phosphorus, copper, zirconium, hafnium, titanium, niobium, tantalum, rhenium, alloys thereof, and combinations thereof. In these or other embodiments, the metal-containing spheres contain one or more ceramics selected from the group consisting of zirconium oxide-based ceramics, aluminum oxide-based ceramics, silicon oxide-based ceramics, mullite, silicon nitride-based ceramics, silicon carbide-based ceramics, boron nitride-based ceramics, aluminum nitride-based ceramics, and combinations thereof.

The coating may further comprise, or be adjacent to, at least one face-sheet disposed on a surface of the coating.

In some embodiments, the coating further comprises one or more spaceholder materials, such as materials selected from the group consisting of $ZnBr_2$, $MgBr_2$, $CaCO_3$, $MgCO_3$, $ZnCO_3$, polymers, organic waxes, glass colloids, and combinations thereof.

In some embodiments, the coating has a thermal conductivity of less than 10 W/m·K at 25° C., and a volumetric heat capacity of less than 1000 kJ/m$^3$·K at 25° C. In certain embodiments, the thermal conductivity is less than 2 W/m·K at 25° C. and/or the volumetric heat capacity is less than 300 kJ/m$^3$·K at 25° C. The coating has a crush strength of about 1 MPa or higher, in various embodiments of the invention.

Some variations provide a thermal barrier material comprising a coating that includes metal-containing spheres sintered or glued together and/or embedded in a matrix, wherein the coating has at least 60% void volume fraction and closed porosity, wherein the coating has a coating thickness from about 50 microns to about 500 microns, and wherein the metal spheres have an average diameter that is from about 5% to about 30% of the coating thickness. In some embodiments, the thermal barrier material coating thickness is less than 200 microns, and the average diameter is from about 10% to about 25% of the coating thickness.

Certain variations provide a coating comprising sintered metal spheres, wherein the coating has at least 85% void volume fraction and closed porosity, wherein the coating has a coating thickness from about 50 microns to about 200 microns, and wherein the metal spheres have an average diameter that is from about 10% to about 25% of the coating thickness.

In some variations, the invention provides a three-dimensional microstructure comprising one or more metals and/or one or more ceramics, wherein the microstructure is porous with at least 60% void volume fraction and with closed porosity, and wherein the microstructure has a thermal conductivity of less than 10 W/m·K at 25° C., a volumetric heat capacity of less than 1000 kJ/m³·K at 25° C., and a crush strength of about 1 MPa (10⁶ N/m²) or higher.

By "closed porosity" it is meant that the majority of the porosity present in the microstructure results from closed pores that do not permit fluid flow into or through the pores. By contrast, "open porosity" results from open pores that permit fluid flow into and out of the pores. The total porosity of the microstructure is the sum of open porosity (measurable by intrusion methods, e.g. mercury intrusion) and closed porosity (measurable by microscopic image analysis or calculable from Archimedes measurements, when the bulk density is measured and the theoretical density is known).

The microstructure is porous with at least 60% void volume fraction, which is the total porosity. In some embodiments, the void volume fraction of the microstructure is at least 65%, 70%, 75%, 80%, 85%, or 90% (total porosity). The porosity may derive from space both within particles (e.g., hollow shapes as described below) as well as space outside and between particles. The total porosity accounts for both sources of porosity.

In some embodiments, the total porosity is about, or at least about, 50%, 60%, 70%, 80%, 85%, 90%, 95%, 99%, or 100% closed porosity. In certain preferred embodiments, essentially all of the porosity is closed porosity.

In some embodiments, closed porosity is attained with closed cells within the microstructure. For example, the microstructure may include closed-cell foam with an average pore size of less than 0.2 mm, such as an average pore size of about, or less than about, 100 µm, 50 µm, 20 µm, or 10 µm.

In some embodiments, closed porosity is attained with face-sheets disposed on the microstructure. A "face-sheet" refers to any suitable barrier disposed on one or more surfaces of the microstructure to close at least a portion of the pores. The face-sheet may be fabricated from the same material as the rest of the microstructure, or from a different material. The thickness of the face-sheet may vary, such as an average thickness of about 10 µm, 50 µm, 100 µm, 0.5 mm, 1 mm, or more. The face-sheet may be joined to the microstructure using sintering, adhesion, or other chemical or physical bonding, or mechanical means, for example. The face-sheets may be disposed on the top or bottom of the microstructure, or both top and bottom, to attain closed porosity.

The microstructure may include an open-celled micro-foam or micro-truss structure with an average cell size less than 0.2 mm, such as an average cell size of about, or less than about, 500 µm, 200 µm, 100 µm, or 50 µm. Micro-truss structures and processes for making them are described in U.S. patent application Ser. No. 14/156,299, filed Jan. 15, 2014, and hereby incorporated by reference herein.

The microstructure may alternatively or additionally include a honeycomb configuration (see FIG. 12 for an example) with a cell size less than 0.2 mm, such as an average cell size of about, or less than about, 100 µm, 50 µm, 20 µm, or 10 µm.

In some embodiments, the microstructure comprises a plurality of hollow spheres having an average sphere diameter of less than 0.2 mm, such as an average sphere diameter of about, or less than about, 100 µm, 50 µm, 20 µm, or 10 µm. It is noted that "sphere" means substantially round geometrical objects in three-dimensional space that resemble the shape of a round ball. Not every "sphere" is perfectly round, some spheres may be fragmented (e.g., FIG. 8), and other shapes may be present within the spheres. For example, imperfect spheres may arise due to pressure applied during sintering, leading to ovoids (egg shapes) or other irregular shapes or random shapes.

By "hollow spheres" it is meant that there is at least some empty space (or space filled with air or another gas such as an inert gas) in the spheres. Typically, the hollow spheres have an average sphere diameter to wall thickness ratio greater than 5, such as about 10, 15, 20, 25, or higher. The average sphere diameter is the total diameter, inclusive of material and space in the sphere. The wall thickness need not be uniform, either within a given sphere or across all spheres.

Generally speaking, the microstructure may include a plurality of hollow shapes selected from the group consisting of spheres, cubes, rods, octets, irregular shapes, random shapes, and combinations thereof. The hollow shapes may have an average maximum dimension of less than 0.2 mm and an average ratio of maximum dimension to wall thickness greater than 5. For example, the hollow shapes may have an average maximum dimension of about, or less than about, 100 µm, 50 µm, 20 µm, or 10 µm. Also, the hollow shapes may have an average ratio of maximum dimension to wall thickness of about, or greater than about, 10, 15, 20, or 25. The wall thickness need not be uniform, either within a given shape or across all shapes. Hollow shapes, compared to perfect spheres, may contain more or less open space between shapes, depending on packing configuration.

The pores between hollow shapes may also be characterized by an average diameter, which is an effective diameter to account for varying shapes of those regions. The average diameter of spaces between hollow shapes may be also less than 0.2 mm, such as about, or less than about, 100 µm, 50 µm, 20 µm, 10 µm, or 5 µm. When there is an adhesive or matrix material present, some or all of the space between hollow shapes will be filled and therefore not porous (except for porosity, if any, within the adhesive or matrix material). In some embodiments, the total porosity is about, or at least about, 60%, 70%, 80%, 85%, 90%, 95%, 99%, or 100% closed porosity, not including the space between hollow shapes. In some embodiments, the total porosity is about, or at least about, 50%, 60%, 70%, 80%, 85%, 90%, 95%, 99%, or 100% closed porosity, including the space between hollow shapes. Essentially, the porosity resulting from open space between hollow shapes may be closed, independently from the closed porosity within the hollow shapes.

The hollow spheres (or other shapes) may be bonded together with an adhesive and/or embedded in a matrix material. In certain embodiments, the hollow spheres (or other shapes) are sintered together without an adhesive or matrix material. It is possible to combine these techniques so that a portion of hollow shapes are bonded together with an adhesive or matrix material while another portion of hollow shapes are sintered together without an adhesive or matrix material.

In some embodiments, the microstructure includes hierarchical porosity comprising macropores having an average macropore diameter of 10 µm or greater and micropores having an average micropore diameter of less than 10 µm. For example, the average macropore diameter may be about, or greater than about, 20 µm, 30 µm, 50 µm, 75 µm, 100 µm, 200 µm, 300 µm, 400 µm, or 500 µm. The average micropore diameter may be about, or less than about, 8 µm, 5 µm, 2 µm, 1 µm, 0.5 µm, 0.2 µm, or 0.1 µm. In certain embodiments, the average macropore diameter is 100 µm or greater and the average micropore diameter is 1 µm or less.

Structural integrity is important for the microstructure for many commercial applications. The structural integrity can be measured by the crush strength, which is the greatest compressive stress that the microstructure can sustain without fracture. The crush strength associated with the microstructure of some embodiments is at least about 0.5, 1, 2, 3, 4, 5, 6, 7, 8, 9, or 10 MPa (1 Pa=1 N/m$^2$) at 25° C. or higher temperatures. Preferably, the crush strength is measured or predicted to be at least 1 MPa under the expected conditions of the intended application. Without being limited by theory, it is believed that good structural integrity can be achieved despite high porosity, due to the presence of micropores which promote good performance even in thin coatings or applications with length scales of less than 1 millimeter, and the closed porosity which assists in distribution of mechanical loads.

In preferred embodiments, the microstructure thermal conductivity is less than 5, 4, 3, 2, or 1 W/m·K measured at 25° C., such as less than 0.9, 0.8, 0.7, 0.6, 0.5, 0.4, 0.3, 0.2, 0.1, 0.09, 0.08, 0.07, 0.06, or 0.05 W/m·K at 25° C. At high porosity, the overall thermal conductivity is reduced because internal pores typically contain still air, which has an extremely low thermal conductivity (approximately 0.02 W/m·K at 25° C.). Internal pores may also contain empty space (vacuum) or an inert gas (e.g., argon or nitrogen).

In preferred embodiments, the microstructure volumetric heat capacity is less than 500 kJ/m$^3$·K measured at 25° C., such as less than 400, 300, 200, 100, 90, 80, 70, 60, or 50 kJ/m$^3$·K at 25° C. At high porosity, the overall heat capacity is reduced because internal pores typically contain still air, which has an extremely low volumetric heat capacity (approximately 1 kJ/m$^3$·K at 25° C.). Again, internal pores may also contain vacuum or an inert gas.

The microstructure may include one or more metals selected from the group consisting of nickel, cobalt, cobalt alloys, iron, chromium, tungsten, molybdenum, phosphorus, copper, zirconium, hafnium, titanium, niobium, tantalum, rhenium, alloys thereof, and combinations thereof. Alternatively, or additionally, the microstructure may include one or more ceramics selected from the group consisting of zirconium oxide-based ceramics, aluminum oxide-based ceramics, silicon oxide-based ceramics, mullite, silicon nitride-based ceramics, silicon carbide-based ceramics, boron nitride-based ceramics, aluminum nitride-based ceramics, and combinations thereof.

In certain embodiments, the microstructure further comprises one or more spaceholder materials, such as spaceholder materials selected from the group consisting of $ZnBr_2$, $MgBr_2$, $CaCO_3$, $MgCO_3$, $ZnCO_3$, polymers, organic waxes, glass colloids, and combinations thereof.

Some variations of the present invention provide a three-dimensional microstructure comprising one or more metals and/or one or more ceramics, wherein the microstructure is porous with at least 85% void volume fraction and with closed porosity, and wherein the microstructure has a thermal conductivity of less than 2 W/m·K at 25° C., and a volumetric heat capacity of less than 300 kJ/m$^3$·K at 25° C. In some embodiments, the void volume fraction of the microstructure is at least 86%, 87%, 88%, 89%, 90%, or higher. In some embodiments, the three-dimensional microstructure has a thermal conductivity less than 0.5 W/m·K at 25° C. In these or other embodiments, the three-dimensional microstructure has a volumetric heat capacity less than 200 kJ/m$^3$·K at 25° C.

The microstructure may include one or more metals selected from the group consisting of nickel, cobalt, cobalt alloys, iron, chromium, tungsten, molybdenum, phosphorus, copper, zirconium, hafnium, titanium, niobium, tantalum, rhenium, alloys thereof, and combinations thereof. Alternatively, or additionally, the microstructure may include one or more ceramics selected from the group consisting of zirconium oxide-based ceramics, aluminum oxide-based ceramics, silicon oxide-based ceramics, mullite, silicon nitride-based ceramics, silicon carbide-based ceramics, boron nitride-based ceramics, aluminum nitride-based ceramics, and combinations thereof.

In some embodiments, the microstructure includes a plurality of hollow shapes selected from the group consisting of spheres, cubes, rods, octets, irregular shapes, random shapes, and combinations thereof, wherein the hollow shapes have an average maximum dimension of less than 0.2 mm and an average ratio of maximum dimension to wall thickness greater than 10. In certain embodiments, the hollow shapes comprise, or consist essentially of, hollow spheres. The hollow shapes may be sintered together without an adhesive or matrix material. Alternatively, or additionally, the hollow shapes may be bonded together with an adhesive and/or the hollow shapes may be embedded in a matrix material.

In some embodiments, the invention provides a three-dimensional microstructure comprising one or more metals and/or one or more ceramics, wherein the microstructure is porous with at least 80% void volume fraction of which at least 90% is closed porosity, and wherein the microstructure has a thermal conductivity of less than 5 W/m·K at 25° C., and a volumetric heat capacity of less than 500 kJ/m$^3$·K at 25° C., wherein the microstructure includes a plurality of hollow shapes selected from the group consisting of spheres, cubes, rods, octets, irregular shapes, random shapes, and combinations thereof, wherein the hollow shapes have an average maximum dimension of less than 0.2 mm and an average ratio of maximum dimension to wall thickness greater than 10.

In some embodiments, the invention provides a three-dimensional microstructure comprising one or more metals and/or one or more ceramics, wherein the microstructure is porous with at least 85% void volume fraction of which at least 95% is closed porosity, and wherein the microstructure has a thermal conductivity of less than 5 W/m·K at 25° C., and a volumetric heat capacity of less than 500 kJ/m$^3$·K at 25° C., wherein the microstructure includes a plurality of hollow shapes selected from the group consisting of spheres, cubes, rods, octets, irregular shapes, random shapes, and combinations thereof, wherein the hollow shapes have an average maximum dimension of less than 0.2 mm and an average ratio of maximum dimension to wall thickness greater than 10.

In some embodiments, the invention provides a three-dimensional microstructure comprising one or more metals and/or one or more ceramics, wherein the microstructure is porous with at least 80% void volume fraction which is substantially all closed porosity, and wherein the microstructure has a thermal conductivity of less than 3 W/m·K at 25° C., a volumetric heat capacity of less than 200 kJ/m$^3$·K at 25° C., and a crush strength of about 0.5 MPa or higher.

The present invention, in some variations, also provides a method of coating a substrate with a thermal barrier material, the method comprising coating the substrate with a three-dimensional microstructure comprising one or more metals and/or one or more ceramics, wherein the microstructure is porous with at least 60% void volume fraction and with closed porosity, and wherein the microstructure has a thermal conductivity of less than 10 W/m·K at 25° C., a volumetric heat capacity of less than 1000 kJ/m$^3$·K at 25° C., and in some embodiments, a crush strength of about 1 MPa (10$^6$ N/m$^2$) or higher.

In some embodiments, the method comprises depositing a coating precursor together with a spaceholder material, and then removing at least a portion of the spaceholder material to generate a three-dimensional microstructure. The method may include a coating technique selected from the group consisting of electrolytic deposition, electroless deposition, sedimentation co-deposition, electrophoresis, slurry coating, dip coating, spray coating, painting, and combinations thereof.

In some embodiments, the method comprises depositing a coating precursor through a pre-existing spaceholder material, and then removing at least a portion of the spaceholder material (by heating or other means) to generate the three-dimensional microstructure. In some of these embodiments, the method includes a coating technique selected from the group consisting of template plating, electrolytic alloy plating, electroless alloy plating, and combinations thereof.

In these methods, the spaceholder material may be selected from, but is not limited to, $ZnBr_2$, $MgBr_2$, $CaCO_3$, $MgCO_3$, $ZnCO_3$, a polymer, an organic wax, a glass colloid, or a combination thereof.

In some embodiments, the method comprises depositing a porous closed-cell or open-cell coating, and then capping the coating with an additional solid layer (i.e., a face-sheet) or multiple layers. Coating particles may be applied to the substrate by thermal or plasma spraying, for example.

In some embodiments, the method comprises pressing or fitting coating particles onto the substrate, and then sintering the coating particles for fusing or casting to the substrate. A sintering technique may be selected from the group consisting of radiant heating, induction, spark plasma sintering, microwave heating, capacitor discharge sintering, and combinations thereof.

Other variations provide a method of forming a freestanding thermal barrier material, the method comprising combining a coating precursor with a spaceholder, and then removing at least a portion of the spaceholder to generate a three-dimensional microstructure comprising one or more metals and/or one or more ceramics, wherein the microstructure is porous with at least 60% void volume fraction and with closed porosity, and wherein the microstructure has a thermal conductivity of less than 10 W/m·K at 25° C., a volumetric heat capacity of less than 1000 kJ/m$^3$·K at 25° C., and in some embodiments, a crush strength of about 1 MPa or higher.

In some embodiments, the method comprises coating a spaceholder, in granular form, with the one or more metals and/or one or more ceramics; and then, following removal of at least a portion of the spaceholder, arranging resulting granular hollow material in a desired shape and sintering or bonding it together.

In some embodiments, the method comprises coating a spaceholder, in granular form, with the one or more metals and/or one or more ceramics; arranging resulting granular material in a desired shape and sintering or bonding it together; and then removing at least a portion of the spaceholder during or after the sintering or bonding.

In some embodiments, the method comprises slip-casting a slurry comprising a spaceholder into a mold, and then sintering the slurry. Alternatively, or additionally, the method may comprise slip-casting a slurry into a mold comprising the spaceholder (i.e. the mold, not the slurry, contains the spaceholder), and then sintering the slurry.

In certain embodiments, the method includes mixing the spaceholder with a matrix material, and then removing at least a portion of the spaceholder prior to or during sintering to form the freestanding thermal barrier material.

Figure 2:
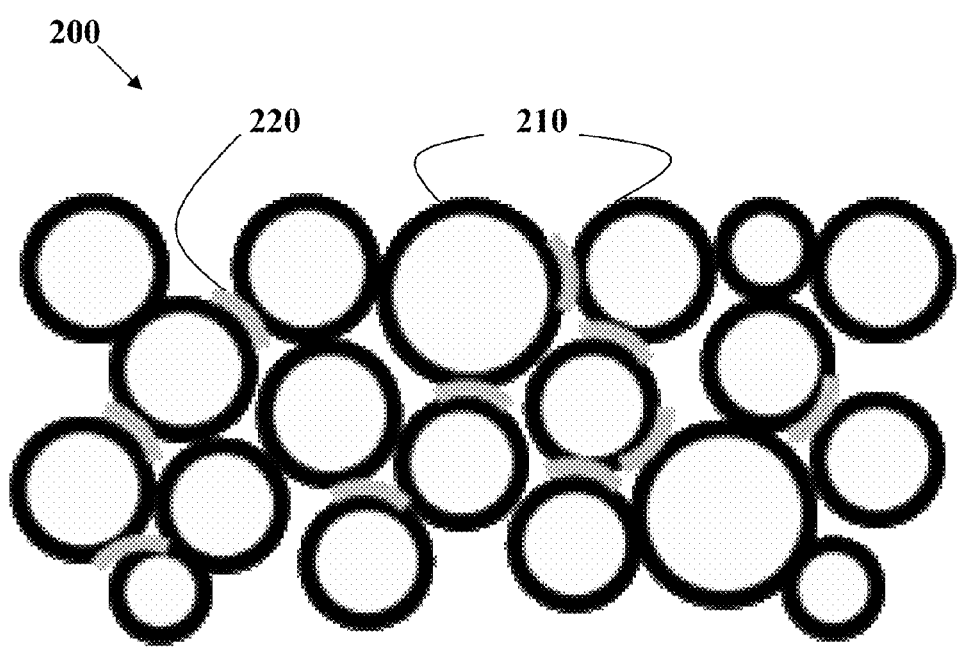
FIG. 2 is a schematic of a cellular architecture (thermal barrier material microstructure) with sintered hollow spheres and an adhesive, in some embodiments.
Figure 3:
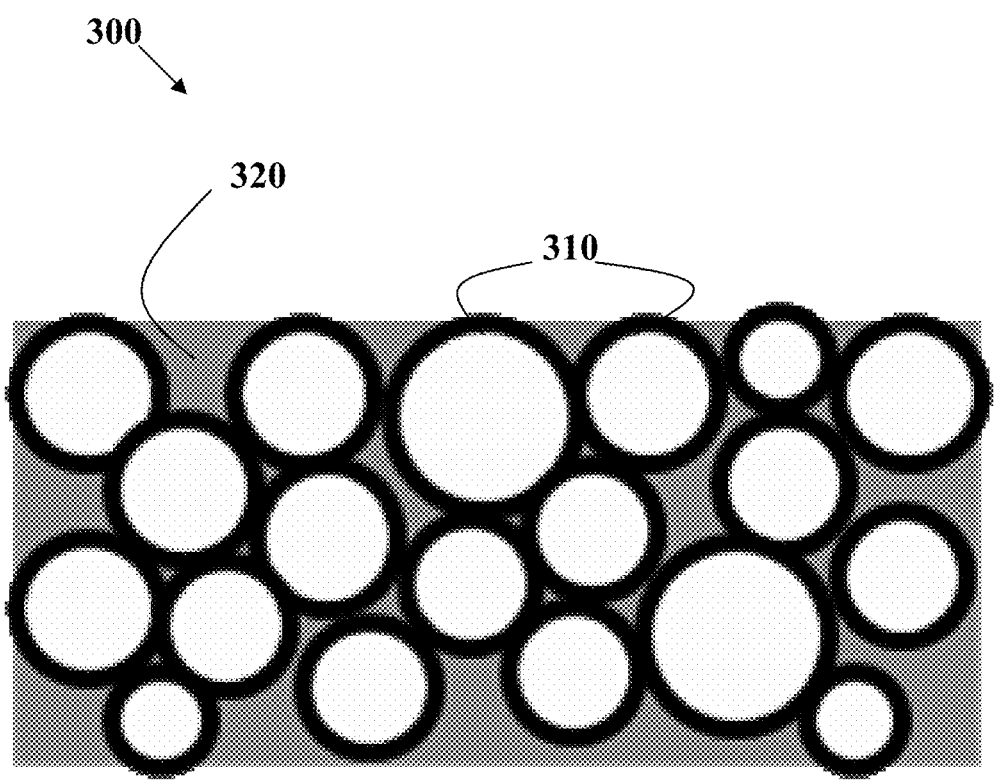
FIG. 3 is a schematic of a cellular architecture (thermal barrier material microstructure) with sintered hollow spheres in a matrix material, in some embodiments.
Figure 4:
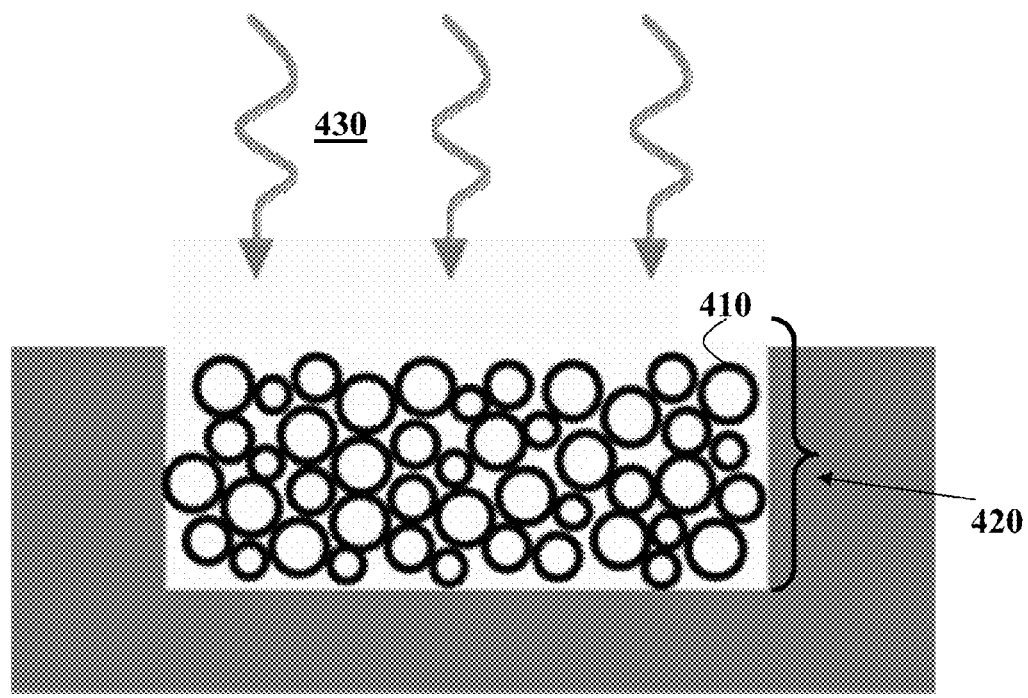
FIG. 4 is a schematic of a first process step for fabricating sintered hollow spheres with a face-sheet as a thermal barrier material (Example 2).

FIG. 1 shows an exemplary schematic of the cellular architecture (microstructure 100) of thermal barrier materials with sintered hollow spheres 110 and space 120 between spheres (outside of the sintered hollow spheres 110). In FIG. 2, the cellular architecture (microstructure 200) includes hollow spheres 210 with an adhesive 220. In FIG. 3, the cellular architecture (microstructure 300) includes hollow spheres 310 in a matrix 320.

A wide variety of cellular architectures are possible. In some embodiments, microstructures incorporate hollow spheres with sphere diameter preferably less than 0.1 mm and diameter to average wall thickness ratio preferably greater than 10. The hollow spheres may be sintered together without matrix or adhesive, bonded together with a small amount of adhesive, or embedded in a matrix material.

Other hollow shapes may be utilized rather than spheres, such as (but not limited to) cubes, rods, octets and irregular or random shapes, with the largest dimension preferably less than 1 mm, and the ratio of the largest dimension to the average wall thickness preferably greater than 10.

Some embodiments utilize a closed-cell microfoam with an average pore size preferably less than 1 mm, such as an average pore size of about, or less than about, 500 µm, 200 µm, 100 µm, or 50 µm.

Figure 12:
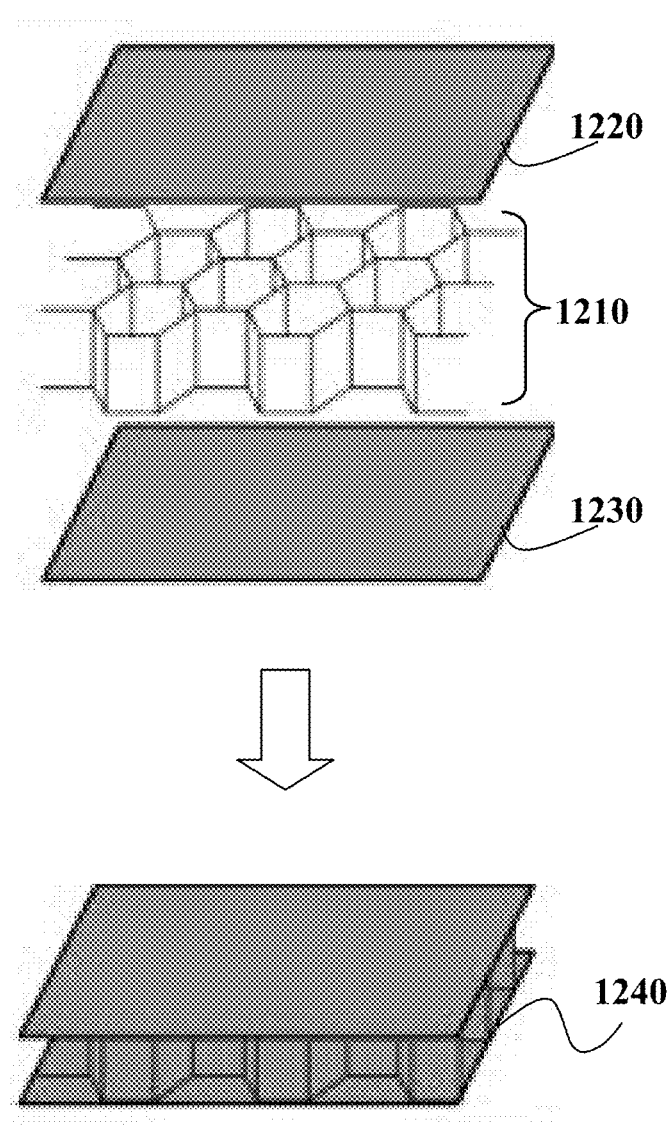
FIG. 12 is a schematic of an alternative honeycomb cellular architecture (thermal barrier material microstructure), in some embodiments.

Some embodiments utilize a honeycomb microstructure with a cell size preferably less than 1 mm and face-sheets to render the porosity closed-celled. The honeycomb microstructure may include an average cell size of about, or less than about, 500 µm, 200 µm, 100 µm, or 50 µm, for example. A closed-cell honeycomb microstructure is depicted in FIG. 12, in which a honeycomb microstructure 1210 is sandwiched between face-sheets 1220 and 1230 to produce a closed-cell honeycomb microstructure 1240.

Hierarchical porosity, i.e. multiple levels of porosity, may be used if desired. For example, hollow spheres may include smaller pores in the walls of the spheres. This enables an increase in the level of porosity and therefore sufficient porosity can be achieved even with relatively thicker walls of the spheres. For example, a material could include hollow spheres with diameter/wall thickness of 5 and a wall that is 50% porous, so that the overall porosity (accounting for porosity both in the walls themselves plus the open space in and between the hollow spheres) is at least 60%.

In some embodiments, open-celled microfoam or microtruss structures are utilized with cell sizes preferably less than 0.1 mm and face-sheets or similar barriers at the top and/or bottom of the microstructure to close the pores. The microfoam or microtruss structures may include an average cell size of about, or less than about, 75 µm, 50 µm, or 25 µm, for example.

Materials of interest for the thermal barrier are any high-temperature material, including (but not limited to) nickel and nickel alloys, e.g. Inconel, Hastelloy, nickel superalloys; cobalt and cobalt alloys; stainless steel; refractory alloys based on Nb, Mo, Ta, W, and/or Re; zirconium and hafnium alloys; titanium alloys; zirconium oxide-based ceramics; aluminum oxide-based ceramics; mullite; silicon oxide-based ceramics and glasses; SiN, SiC, BN, or AlN. Some embodiments do not include silicon oxide-based ceramics.

The methods to form thermal barrier materials according to the present invention may be divided into (i) coating methods that can be used to coat an article and (ii) freestanding synthesis methods that can be used to make a block of material. The block of material can then be machined to create specific articles. Alternatively, the hollow-sphere sintering and similar methods are suitable to fabricate a net shape part by pressing and sintering the hollow spheres in a mold that produces the desired shape.

In some methods to coat an article with a thermal barrier material, a coating is first deposited together with a spaceholder material, followed by completely or partially removing the spaceholder material. The coating may be deposited, for example, by electrolytic deposition, electroless deposition, sedimentation/flotation co-deposition, electrophoresis, or slurry coating (dip, spray, paint, etc.) which may employ alloy powder or liquid precursor and spaceholders in suspension/slurry.

In some methods, a coating is deposited through a spaceholder material by, for example, electrolytic deposition, followed by removal of the spaceholder. Possible metals and alloying elements which could be plated in this way include Ni, Co, Fe, Cr, W, Mo, P, and Cu. Template plating, electrolytic alloy plating, or electroless alloy plating may also be utilized to deposit a coating through a spaceholder material.

In some methods, a porous coating is deposited to form a closed-cell or open-celled coating, followed by capping the coating with a solid layer (face-sheet or similar barrier) in the case of an open-celled coating. The additional solid layer is optional when a closed-cell coating is formed. The porous coating may be deposited by thermal/plasma/wire-arc spraying of a highly porous coating, or spraying hollow spheres/particles onto a part, for example.

Pressing and sintering may be employed in some embodiments. Some methods utilize pressing/fitting onto an existing part, and then sintering coating and fusing to substrate. Some methods utilize pressing and sintering a free-form coating/heat shield, incorporating into mold and casting around or fusing to existing part, e.g. by welding, brazing, etc. Sintering techniques include, but are not limited to, radiant heat, induction, spark plasma sintering, microwave, and capacitor discharge sintering.

Anodic deposition/growth may be employed in some embodiments, to control pore size using current density, electrolyte composition, temperature, and surface pretreatment, for example. Electrolytic/electrophoretic/electroless deposition of sealing coat into/onto an anodic oxide may be utilized in certain embodiments.

Open-celled porous coatings may be capped with a thin solid layer to close off the porosity from the environment by a variety of techniques. For example, some methods comprise bonding on a metal sheet by brazing or induction melting, e.g. stainless steel, nickel alloys (Inconel, Hastelloy, etc.) or other high-temperature alloys. Some methods comprise filling in the outermost layer of the porous material by adding a dense coating, which for present purposes shall also be considered a face-sheet. Many variations are possible, such as one side incorporated a bonded metal sheet while the other side incorporated a dense coating/filling in an outer region near the surface, to achieve closed porosity.

In some methods to form a freestanding, bulk thermal barrier material, granular spaceholders are coated, the spaceholder is removed (at least in part), and then the granular hollow material may be arranged into certain shapes and sintered or bonded.

In some methods to form a freestanding, bulk thermal barrier material, a slurry may be slip-cast into a mold containing a spaceholder, or a slurry may be slip-cast into a mold that includes a spaceholder with the desired shape, and then fired.

In some methods to form a freestanding, bulk thermal barrier material, slurry coating of an open-cell polymer foam is utilized, followed by sintering/firing the metal while burning out polymer. Alternatively, slurry coating of an open-cell polymer structure may be done, followed by heating the slurry to a green state, and then selectively etching out the polymer core before firing to sintering temperature. In certain embodiments, high-internal-phase emulsions may be used to create a foam that is hierarchically porous with pores in the walls.

In some methods to form a freestanding, bulk thermal barrier material, electroforming is used to form a freestanding coating which is then incorporated into/onto a mold and cast around. This procedure may produce a good surface finish with minimal post-processing.

In some embodiments, the method comprises mixing of spaceholder material with a matrix material, followed by removal of the spaceholder and sintering into a solid body.

In some embodiments, foaming of a solid starting material is utilized to create a microporous foam (for either a coating or a bulk thermal barrier material). Foaming of light metals may be conducted by inert gas injection or by a blowing agent, for example.

Honeycomb microstructures may be produced by using a positive mold of the honeycomb structure fabricated out of a polymer using photolithography, and then plating over using electrodeposition or electroless deposition. Polymer may be dissolved or burned out afterwards, leave a hollow honeycomb-like structure.

Honeycomb microstructures may alternatively be produced by using a negative mold of the honeycomb fabricated using photolithograthy. If the mold is adhered on a conductive surface, metal can be electroplated into the open channels to create the honeycomb structure. The photopolymer may be etched or burned out. Alternatively, metal can be electrolessly deposited into the negative mold to form the honeycomb.

When spaceholder materials are employed, a wide variety of materials may be used. In some embodiments, polymer spheres may be mixed with a metal or ceramic slurry, deposited in a mold, and the material may be fired under inert conditions to sinter the metal and then in air or hydrogen to remove the polymers. Polymers that depolymerize at higher temperatures could be used, along with removal of the monomers, oligomers, or degradation products.

Evaporating salts may be utilized as spaceholders. A salt may be mixed with a metal powder or ceramic precursor, the mixture poured into a mold, heated to achieve a green strength, and then heated to an even higher temperature to evaporate away the metal salts. Possible metal salts include $ZnBr_2$ which melts at 400° C., and boils at 650° C. By heating below 400° C., a reasonable green strength will be established. Then by heating around 650° C., the rest of the salt will evaporate away. $MgBr_2$ melts at 710° C. and boils at 1280° C. By heating below 700° C., a reasonable green strength will be established. Then by heating around 1280° C., the rest of the salt will evaporate away.

Volume-reducing templates may be utilized, followed by incorporation of the remnant material into the porous solid. In particular, templates may be incorporated with a metal powder or ceramic precursor, the mixture poured into a mold, heated to achieve a reasonable green strength, and then heated to an even higher temperature to decompose the templates and infiltrate the remaining material into the porous solid.

Possible volume-reducing templates include $CaCO_3$, which decomposes to CaO and loses $CO_2$ at 825-900° C. The CaO may be removed by washing with an acid. $MgCO_3$ decomposes at 325° C. and loses remaining $CO_2$ at 900° C. (does not melt). The remaining MgO may be removed with an acid, or may become part of a ceramic layer. $ZnCO_3$ loses $CO_2$ and forms ZnO at 300° C. The ZnO may be removed by washing with acid or base, evaporating it away by heating to 1350-1500° C., heating it in a reducing atmosphere and creating Zn metal that either diffuses into the porous material or is washed away with acid or base, and/or heating it to bond it into a ceramic layer.

Spaceholders may be coated lightly with a metal or ceramic by spraying on slurry, milling, or mixing with slurry or dry powder with binders, or by chemical vapor deposition. Then the spaceholder may be burned out, leached out, sublimated, boiled out, and/or reacted with the coating material to create unconnected hollow spheres.

One technique is to incorporate spaceholders directly into the coating. This opens up a path (i.e. holes in the coating) for the spaceholder material to leave the coating shell without destroying the coating. Upon additional heat treatments or coating steps, the holes in the coating can then be closed by sintering or coating over/filling in, respectively.

Spaceholder removal methods include, but are not limited to, oxidation, reduction, combustion, or thermal degradation of spaceholders; chemical etching of spaceholders, such as acid etching, base etching, or other dissolution.

Hierarchical porosity, especially smaller pores in the particle walls to increase volume fraction of voids (total porosity), may be achieved by several techniques. In some embodiments, dealloying of the wall material is used, such as described in Erlebacher, et al., "Evolution of nanoporosity in dealloying" *Nature* Vol. 410, p. 450 (2001), which is incorporated by reference herein. Controlled/targeted etching of the wall material may be utilized. Some embodiments employ spaceholders above 74 vol % whereby the spaceholders will touch and create additional holes in the walls. If spaceholders are deposited as a fluid that solidifies (such as a high-internal-phase emulsion of polymer monomers), multiple openings between pores will be created where the spaceholder droplets touch. This leads to hierarchical porosity. Certain methods may employ teachings set forth in Gross and Nowak, "Hierarchical Carbon Foams with Independently Tunable Mesopore and Macropore Size Distributions," *Langmuir* 26 (13), 11378-11383 (2010), which is incorporated by reference herein.

Some embodiments provide a "thermal protection system" which incorporates any of the disclosed materials, coatings, or microstructures. A thermal protection system may include the substrate or part being thermally protected, or may be configured to be applied to a substrate or part at a later time. A thermal protection system may optionally include control and maintenance methodologies, such as monitoring the coating over time, or monitoring the substrate or part over time or after a specific thermal event.

EXAMPLES

Example 1

Sintered Inconel Spheres

One example of this invention is a material comprising sintered hollow nickel alloy (Inconel 718) spheres with a diameter of 50 microns and a wall thickness of 1.0 micron, with a diameter to wall thickness ratio of 50. This microstructure (as depicted in FIG. 1) exhibits a calculated thermal conductivity of 0.12 W/m·K and heat capacity of 290 kJ/m³·K. The thermal conductivity and heat capacity are calculated (not considering radiation and convection) according to Solórzano et al., "Thermal Properties of Hollow Spheres," *Multifunctional Metallic Hollow Sphere Struct.*, pp. 89-107 (2009) which is incorporated by reference herein. For Inconel 718, a thermal conductivity of 11 W/m·K and heat capacity of 3900 kJ/m³·K is used in estimating the thermal conductivity and heat capacity of sintered spheres. For comparison, conventional zirconia-based thermal barrier coatings used in the aviation industry have thermal conductivities around 0.8 W/m·K and heat capacities around 2200 kJ/m³·K.

The compressive "crush" strength can be used as a measure of structural integrity and it can be estimated with the following equation for closed-celled foams from Ashby, "The properties of foams and lattices," *Phil. Trans. R. Soc. A* 2006 364, which is incorporated by reference:

$$\sigma_{pl}/\sigma_{y,s} = 0.3(\rho/\rho_s)^{1.5}$$

where $\sigma_{pl}$ is the plateau or crush strength of the hollow sphere material, $\sigma_{y,s}$ is the yield strength of the solid constituent material, $\rho$ is the density of the hollow sphere material, and $\rho_s$ is the density of the solid constituent material. The calculations assume that there is no adhesive or matrix between the hollow spheres. Using $\sigma_{y,s}$=1170 MPa (at 25° C.) for Inconel 718, a crush strength of 7.1 MPa is calculated for the sintered hollow Inconel spheres with 7.4% relative density. The relative density of 7.4% results in good structural integrity with a crushing strength of about 7 MPa, while the Inconel 718 alloy enables operating temperatures up to 1000° C.

A thermal barrier material comprised of sintered Inconel spheres with an average diameter of 50 microns and an average wall thickness of 0.5 microns (rather than 1 μm) exhibits a calculated relative density of 3.8%, resulting in a calculated crush strength of 2.6 MPa. The calculated thermal conductivity is about 0.1 W/m·K and calculated heat capacity is about 150 kJ/m³·K.

Example 2

Sintered Hollow Glass Spheres

Figure 5:
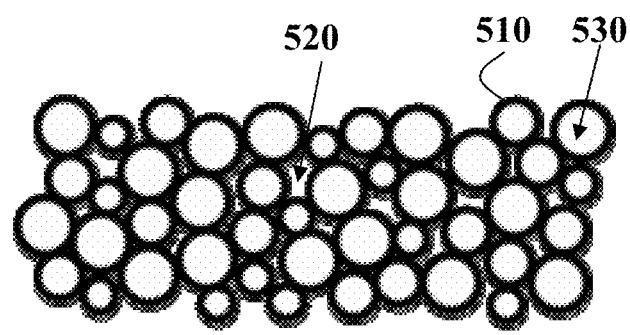
FIG. 5 is a schematic of a second process step for fabricating sintered hollow spheres with a face-sheet as a thermal barrier material (Example 2).

FIGS. 4-7 are collectively a schematic flowchart of sintered hollow spheres material fabrication. Hollow glass spheres (silica, soda-lime, borosilicate, aluminosilicate, etc.) 410 are fused into a thin layer 420 by heating 430 above the glass transition temperature (FIG. 4), creating a closed-cell structure with high porosity similar to the schematic in FIG. 1. Spheres 510 are fused to adjacent spheres at flattened points of contact, leaving open space 520 between the spheres, as well as space 530 inside them (FIG. 5). The resulting structure has a large (>60%) open volume fraction, creating a material with low heat capacity and low thermal conductivity and relatively high crush strength. The properties can be tailored by selecting hollow spheres with different diameter and wall thickness.

Figure 6:
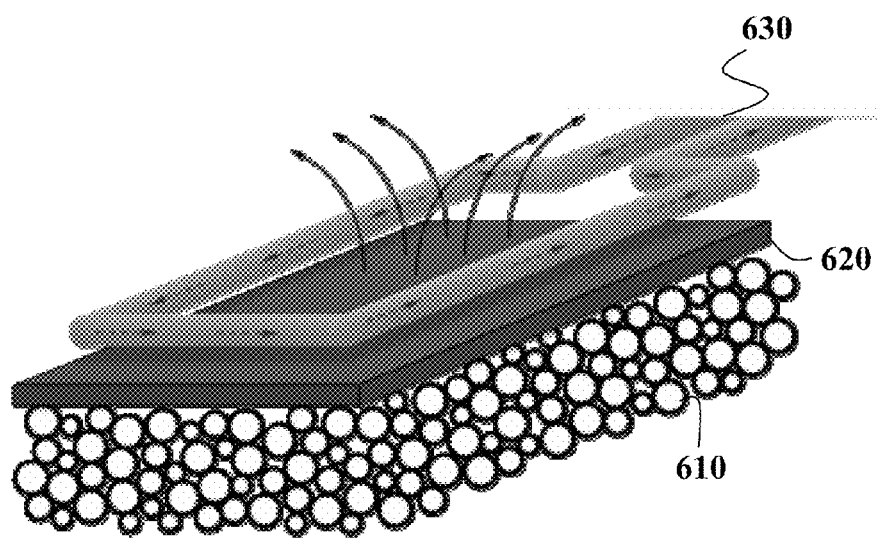
FIG. 6 is a schematic of a third process step for fabricating sintered hollow spheres with a face-sheet as a thermal barrier material (Example 2).
Figure 7:
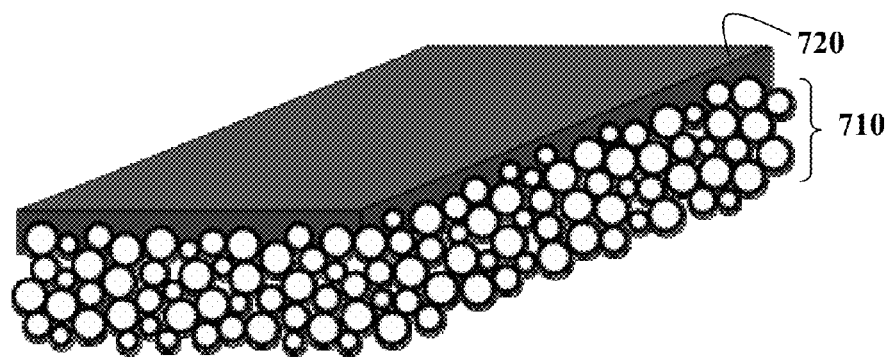
FIG. 7 is a schematic of a fourth process step for fabricating sintered hollow spheres with a face-sheet as a thermal barrier material (Example 2).

A ductile, corrosion-resistant and oxidation-resistant cover layer 620 is added by induction melting of a thin nickel sheet onto the top surface of the porous glass structure (FIG. 6). Transverse inductive heating 630 (as depicted in FIG. 6) or longitudinal inductive heating (not shown) rapidly melts the metal layer, allowing it to quickly infiltrate into the top surface of the foam, without melting or deforming the glass spheres 610 since the magnetic field does not induce a current in the insulting glass.

Figure 8:
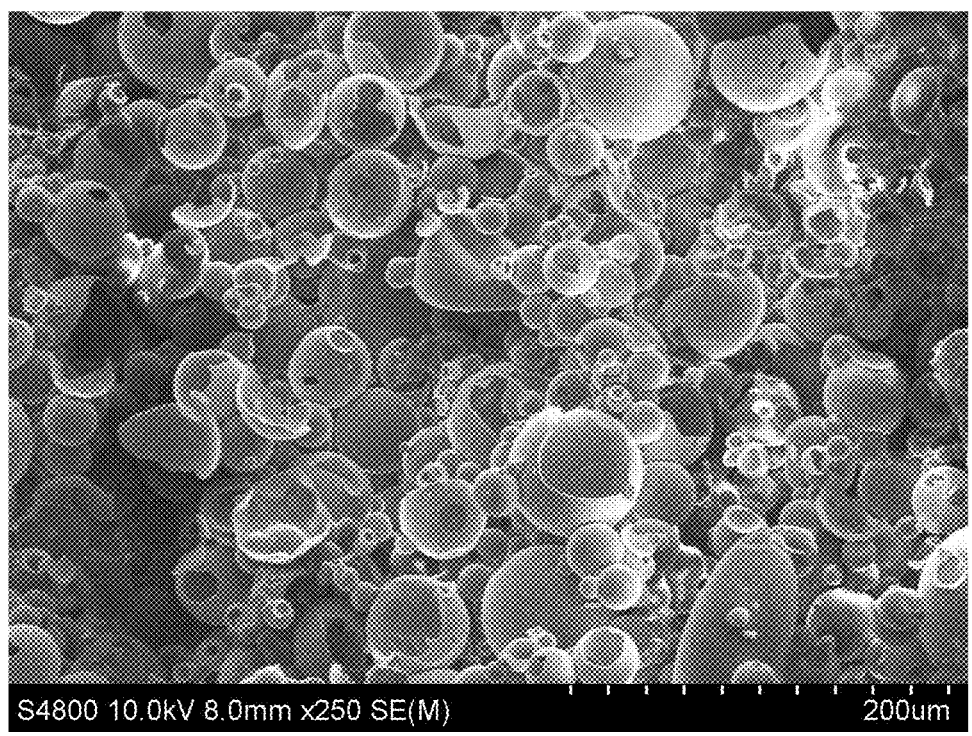
FIG. 8 is a SEM micrograph of a microstructure with fused hollow silica spheres, according to Example 2.

The resulting structure (FIG. 7) is composed of a metallic face-sheet 720 able to withstand high temperatures (>1000° C.), attached to a highly porous, low thermal conductivity and low heat capacity core 710. The microstructure of the core is depicted in FIG. 8, which is a SEM micrograph of the fused hollow silica spheres. The sintered glass spheres have a diameter of 16-40 microns and an average wall thickness of about 0.8 microns. The thermal conductivity is about 0.08 W/m·K and heat capacity is about 300 kJ/m$^3$·K.

Example 3

Flotation Co-deposition of Hollow Glass Spheres in a Nickel Matrix

Figure 9:
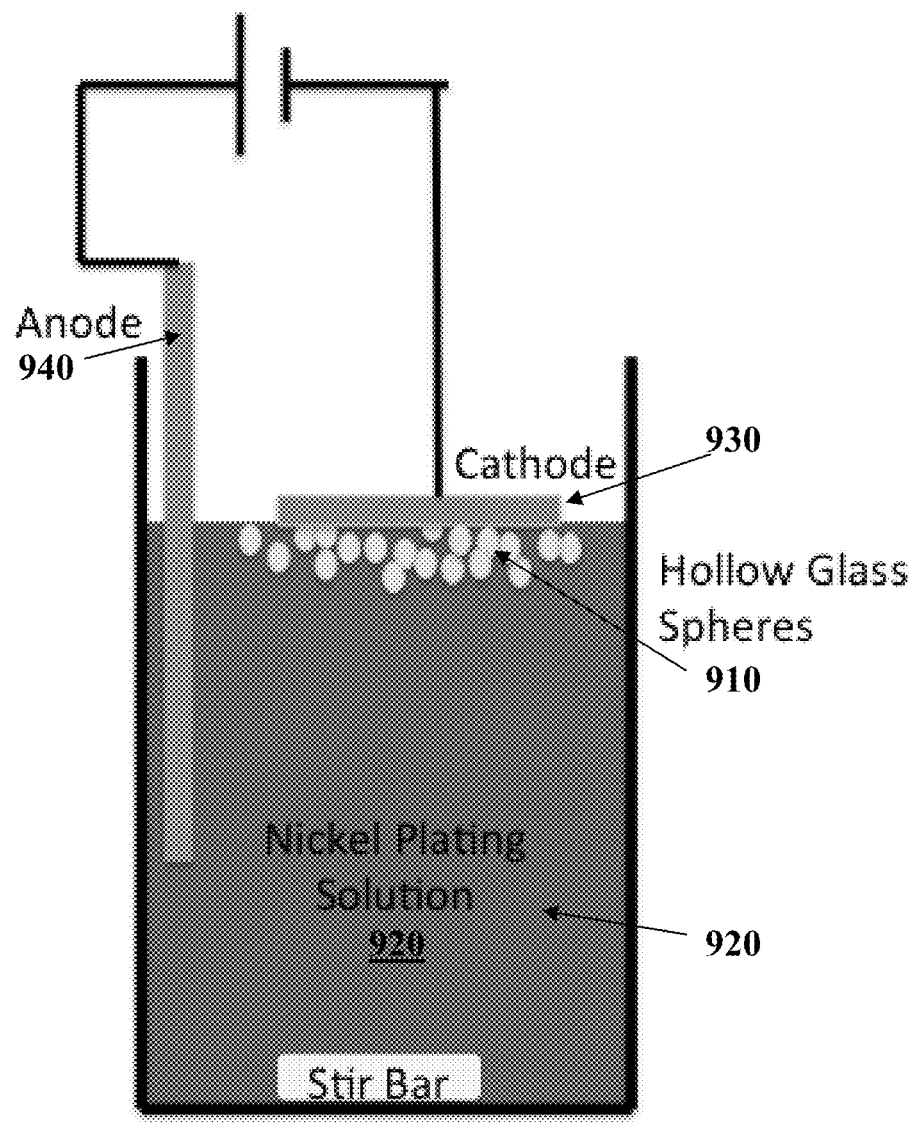
FIG. 9 is a schematic of a flotation co-deposition process setup, according to Example 3 of the invention.

Hollow glass spheres are incorporated into a nickel matrix at a high volume fraction through flotation co-deposition. A commercial nickel sulfamate plating solution is used to electrodeposit the nickel. A schematic of the flotation co-deposition process setup is shown in FIG. 9. Hollow glass spheres 910 are added directly to 300 mL of plating solution 920 at a concentration of 3 g/L. The mixture is stirred continuously and heated to 65° C. After reaching temperature, the majority of the added hollow glass spheres 910 have floated to the top. A copper cathode 930 is prepared by degreasing (alcohol) and acid activation (10% sulfamic acid). The cathode is immersed just below the surface of the floating glass spheres 910 and a current equivalent to 10 mA/cm$^2$ is applied for 2 hours (anode 940).

Figure 10:
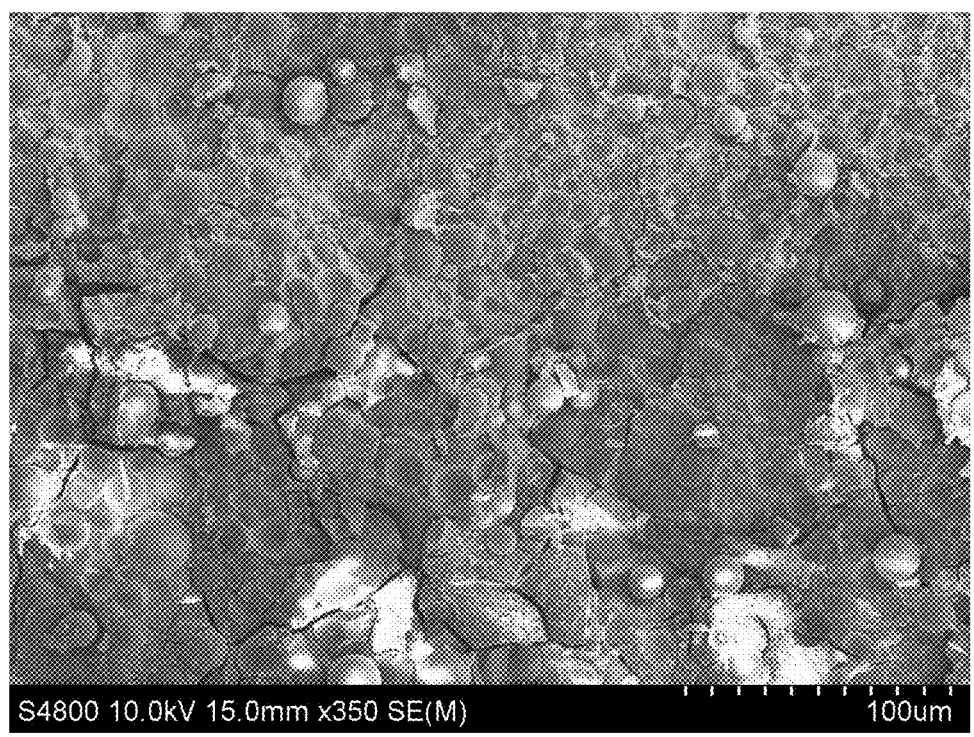
FIG. 10 is a SEM micrograph of flotation co-deposited hollow glass spheres in a nickel matrix (Example 3).
Figure 11:
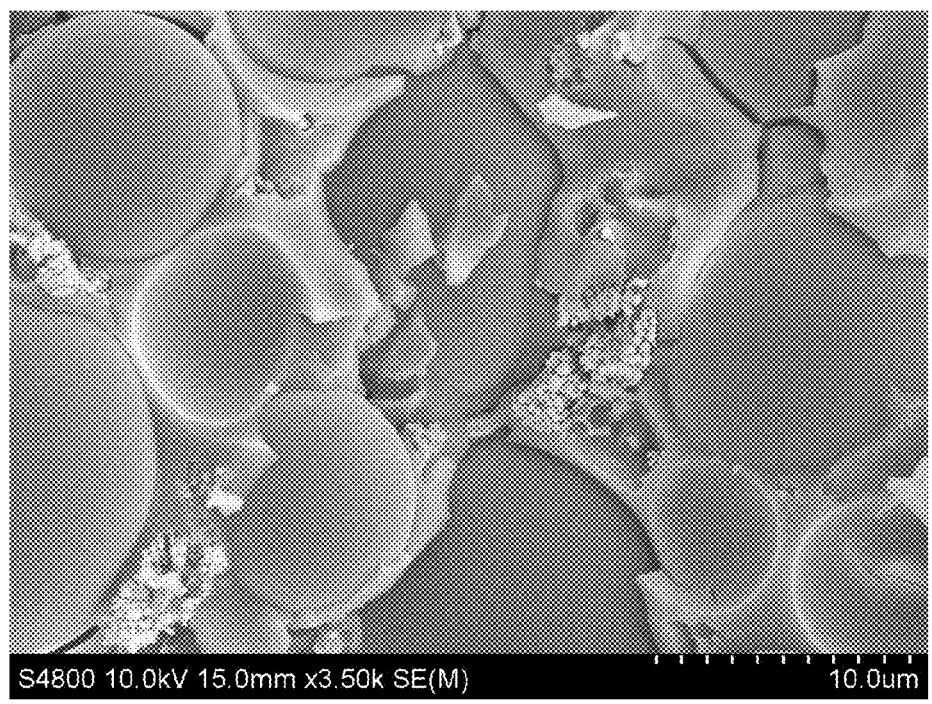
FIG. 11 is a SEM micrograph of flotation co-deposited hollow glass spheres in a nickel matrix (Example 3).

While plating, the solution is periodically stirred by hand at the surface to replenish solution at the interface and facilitate better packing of the spheres 910 during co-deposition. After the plating is complete, the sample is rinsed and fractured for analysis of the packing density in the deposit. SEM images of the deposit are shown in FIGS. 10 and 11 (SEM micrographs of flotation co-deposited hollow glass spheres in a nickel matrix). The thermal conductivity is estimated to be about 0.8 W/m·K and heat capacity is about 325 kJ/m$^3$·K.

All example materials (Examples 1, 2, and 3) possess lower thermal conductivity and heat capacity compared to a conventional air plasma sprayed (APS) zirconia-based thermal barrier coating, which has a thermal conductivity of about 1 W/m·K and heat capacity greater than 1000 kJ/m$^3$·K.

The invention disclosed herein has various commercial and industrial applications. Applications include, but are not limited to, thermal barrier materials for engine applications, e.g. cylinder liners and exhaust valve liners; and thermal barrier materials for exhaust structures and thermal signature reduction. This invention is applicable for jet engine applications as thermal barrier material on combustors, hot section blades, shrouds and nozzles, and exhaust structures (e.g. flaps and liners).

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A coating comprising metal-containing spheres that are sintered or glued together and/or embedded in a matrix, wherein said coating has at least 60% void volume fraction and closed porosity, wherein said coating has a coating thickness from about 50 microns to about 500 microns, wherein said metal-containing spheres have an average diameter that is from about 5% to about 30% of said coating thickness, and wherein said coating has a thermal conductivity of less than 10 W/m·K at 25° C. and a volumetric heat capacity of less than 1000 kJ/m$^3$·K at 25° C.

2. The coating of claim 1, wherein said average diameter is from about 10% to about 25% of said coating thickness.

3. The coating of claim 1, wherein said coating thickness is at least 50 microns and less than 200 microns.

4. The coating of claim 3, wherein said void volume fraction of said coating is at least 85%.

5. The coating of claim 1, wherein said void volume fraction of said coating is at least 75%.

6. The coating of claim 1, wherein said metal-containing spheres are hollow and have an average diameter to wall thickness ratio greater than 10.

7. The coating of claim 1, wherein said metal-containing spheres contain micropores having an average micropore diameter of less than 10 microns.

8. The coating of claim 7, wherein said average micropore diameter is 1 micron or less.

9. The coating of claim 1, wherein said metal-containing spheres contain one or more metals selected from the group consisting of nickel, cobalt, cobalt alloys, iron, chromium, tungsten, molybdenum, phosphorus, copper, zirconium, hafnium, titanium, niobium, tantalum, rhenium, alloys thereof, and combinations thereof.

10. The coating of claim 1, wherein said metal-containing spheres contain one or more ceramics selected from the group consisting of zirconium oxide-based ceramics, aluminum oxide-based ceramics, silicon oxide-based ceramics, mullite, silicon nitride-based ceramics, silicon carbide-based ceramics, boron nitride-based ceramics, aluminum nitride-based ceramics, and combinations thereof.

11. The coating of claim 1, said coating further comprising at least one face-sheet disposed on a surface of said coating.

12. The coating of claim 1, said coating further comprising one or more spaceholder materials.

13. The coating of claim 12, wherein said spaceholder materials are selected from the group consisting of ZnBr$_2$, MgBr$_2$, CaCO$_3$, MgCO$_3$, ZnCO$_3$, polymers, organic waxes, glass colloids, and combinations thereof.

14. The coating of claim 1, wherein said thermal conductivity is less than 2 W/m·K at 25° C.

15. The coating of claim 1, wherein said volumetric heat capacity is less than 300 kJ/m$^3$·K at 25° C.

16. A coating comprising sintered metal spheres, wherein said coating has at least 85% void volume fraction and closed porosity, wherein said coating has a coating thickness from about 50 microns to about 200 microns, and wherein said metal spheres have an average diameter that is from about 10% to about 25% of said coating thickness.

17. A coating comprising sintered hollow metal spheres, wherein said coating has at least 75% void volume fraction, wherein said coating has a coating thickness from about 50 microns to about 500 microns, and wherein said metal spheres have an average diameter that is from about 20 microns to about 100 microns.

18. The coating of claim 17, said coating further comprising at least one face-sheet disposed on a surface of said coating.

19. The coating of claim 17, wherein said metal spheres contain one or more metals selected from the group consisting of nickel, chromium, cobalt, iron, copper, aluminum, zirconium, niobium, molybdenum, tantalum, tungsten, rhenium, alloys thereof, and combinations thereof.

* * * * *